United States Patent Office

3,650,922
Patented Mar. 21, 1972

3,650,922
ELECTROCHEMICAL MACHINING OF METALS
Jan Augustin, Podolie, Ctibor Trebichavsky, Nove Mesto nad Vahom, and Jan Zubak, Ostrov, Czechoslovakia, assignors to Vyskumny ustav mechanizacie a automatizacie, Nove Mesto nad Vahom, Czechoslovakia
Filed Aug. 29, 1969, Ser. No. 854,074
Int. Cl. B23p 1/00
U.S. Cl. 204—143 M   6 Claims

ABSTRACT OF THE DISCLOSURE

An electrochemical machining process wherein a current is passed between an electrode and a workpiece and wherein at least two electrolytic fluids are alternated in the space between the electrode and workpiece.

BACKGROUND OF INVENTION

This invention relates in general to electrochemical machining and in particular to an improved method of employing electrolyte fluids in electrochemically forming and shaping metal objects.

Electrochemical machining has come into extensive use because of its ability to machine any conductive metalloid, even those not otherwise workable by ordinary machining methods or by use of conventional cutting and shaping tools. Electrochemical processes produce articles free of artificial stresses and metallurgical changes normally induced by conventional tools and allows the rapid and economical production of complex shapes and forms.

The process of electrochemical machining employs a shaped electrode tool which is advanced toward and into the metalloid workpiece while simultaneously supplying an electrolyte solution under pressure, within the interspace between the eletcrode tool and the workpiece. A direct current source is conventionally supplied to the electrode and the workpiece to make the former a cathode and the latter an anode so that an electrolytic action is produced which rapidly erodes material from the anodic workpiece in front of and in the shape of the advancing electrode. The flow of electrolyte fluid continually rinsing the interspace to remove the dissolved metal.

As is well known the operation of the electrochemical machining process depends upon the interrelationship of various factors, such as the electrolyte solution, voltage and current density and the depth and length of the interspace between electrode and workpiece. Each of these factors have their own operating parameters. While the present invention is concerned with the use of the electrolyte fluid, since all the factors are interrelated, various advantages and benefits will be obtained with regard to the operating parameters of those other factors.

Conventionally a stable electrolyte solution of uniform conductance was employed, however it was soon found that while such solutions permit extremely high speeds to be obtained accuracy of shape reproduction was poor. Particularly was this so when machining curved surfaces and sharp edges, since in these situations, the interspace is not uniform. As a result, many expensive time consuming corrections were required to be made in the electrode tool during a single machining to obtain accuracy and reproductibility.

Recently various electrolyte and gas mixtures have been used in combination to achieve more accurately formed shapes. The combination of electrolyte and gas has obviated the need for electrode correction and repair, however the processing speed has been drastically reduced. In fact with electrolyte-gas mixtures the average speed is somewhat less than one third the speed of that when only a homogenous electrolyte is used. This reduction in speed can be attributed to the fact that the working fluid (electrolyte) is non-homogeneous, has a less effective conductance and consequently a reduced current density, all other factors remaining equal.

It is the object of the present invention to overcome the disadvantage of the prior art processes and to provide an improved method of electrochemically machine metal materials.

SUMMARY OF THE INVENTION

According to the present invention there is provided a method of electrochemically machining metalloids, employing a shaped electrode which is advanced toward and into the workpiece, wherein there is alternately supplied to the interspace between electrode and workpiece at least two electrolyte fluids each of different specific conductance, the interval of alternation being determined as a function of the depth of the interspace and the length of the interspace.

The present invention results in obtaining simultaneously high speed and accuracy of shape reproductibility. Even though electrolyte-gas mixtures may be employed, the speeds obtained by the present process are substantially as high as in conventional prior art electrolyte operation. Reproductibility is achieved because by the present method narrow interspaces are required making the dissolution of the metal sharp and accurate. Furthermore very significant reductions in the consumption of electrolyte solution is obtained and often the savings can amount to 90 percent of the amount of solution previously consumed. Additionally, with the present invention, lower voltages and current consumption is also obtained. Lastly it has been found that the machined product is significantly more smooth being free of cavitations or terraced-shaped projections.

These advantages as well as others together with a full description of the invention is disclosed in the following specification in which reference is made to the annexed drawings.

DESCRIPTION OF THE INVENTION

Figure 2:
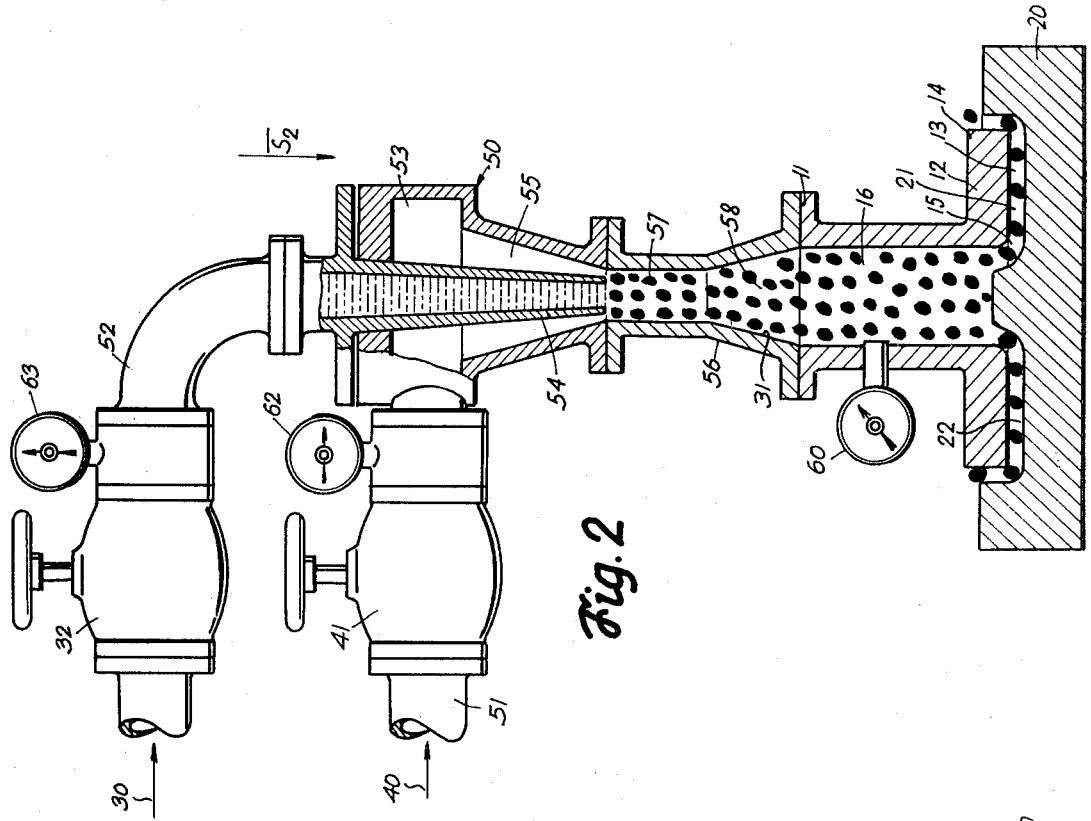
FIG. 2 is a view similar to that of FIG. 1 showing the process being carried out under changed pressure conditions and higher speed.

Turning now to the drawings for the specific illustration of the present invention, the figures show a hollow cylindrical electrode 11 which is adapted to be vertically moved as for example by having a flange at its upper end conventionally secured to an arbor or ram device (not shown). The lower end of the electrode 11 is provided with a second circular flange 12 forming the actual working tool head, having a lower face 13 and a lateral vertical wall 14 and a fluid opening 15 exiting from the electrode 11. An insulator sleeve 16 lines the interior wall of the electrode 11. The electrode 11 comprises the working tool of the device, and while here shown an annular disc can be any configuration determined by the shape of the desired machining to be done.

Mounted below the electrode 11 on a suitable insulated base (not shown) is a workpiece 20. The workpiece is spaced from the electrode 11 a distance or interspace 21 sufficient to permit flow of fluid and takes on a counterface 22 conforming to the shape of the electrode 11. In the illustrated form of the apparatus the workpiece 20 is cylindrical and is being machined to provide a hollow core.

An electrolyte solution 30, containing conductive particles 31, is fed from a pressured source (not shown) at a predetermined rate through a valve 32 into a conduit 52 and a nozzle 54. A gaseous media 40 is fed, also from a pressured source (not shown), through a valve 41 at predetermined rates into a conduit 51 and thence into a body 50 coaxially surrounding the nozzle 54. The body 50 comprises a cylindrical chamber 53 having a depending conical hopper 55, the lower end of which is aligned in a horizontal plane with the end of the nozzle 54. Intermediate the body 50 and the electrode 11 is a mixer 56 comprising an upper cylindrical neck 57 and on outwardly flaring diffusing chamber 58. The conduits 51 and 52, the nozzle 54 body 50 and mixer 56 are all provided with appropriate flange means and are suitably sealed and insulated in conventional manner to prevent leakage and unwanted electrolytic action.

The apparatus is equipped with suitable pressure indicators namely; gauge 60 to determine the pressure of the electrolyte-gas mixture in the electrode 11, gauge 62 to indicate the gas pressure and gauge 63 to indicate the electrolyte solution 30 fed to the conduit 52.

In use the electrode 11, generally copper, is connected through suitable means (not shown) to the negative pole of a direct current source making it cathodic while the workpiece 20 which for example may be chromium-nickel steel is connected by suitable means to the positive pole of the direct current source making it anodic.

It is to be appreciated that the present invention is a part of conventional and common apparatus well known in the art. For these reasons only those elements necessary to the specific understanding of the present invention are shown in the figures; namely apparatus for feeding and mixing the electrolyte and gas fluids, the electrode and the workpiece. The various structural members and elements for supporting the workpiece such as an insulated base, for movably supporting the electrode such as an arbor or ram press, for removing the dissolved metal and consumed electrolyte solution such as a pump and drain and the sources of current, pressure cables and contacts, are all omitted for the sake of brevity and because they are believed unnecessary for a full understanding of the invention.

Figure 1:
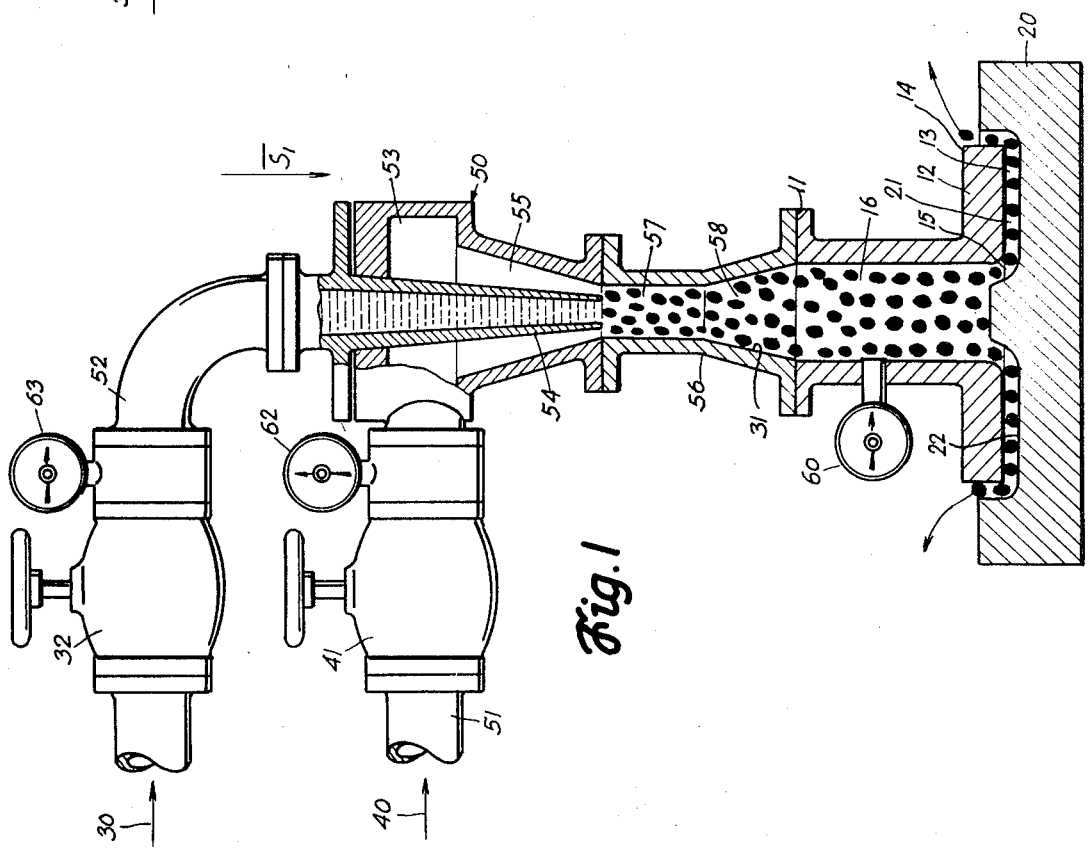
FIG. 1 is a view, partially sectioned along a vertical plane, of a schematic embodiment of apparatus for electrochemically machining metalloids showing the employment of an electrolyte-gas mixture as a working fluid.

The apparatus shown in the figures when conventionally operated proceeds by simultaneously supplying an electrolyte 30 for example a 50 percent solution of sodium nitrate to the nozzle 54 and gas 40 for example air enriched with nitrogen and carbon oxide to the hopper 55. The two media are mixed within the chamber 57 producing an electrolyte-gas fluid including conductive electrolytic particles 31 in the form of variously shaped droplets of relative non-homogeneous size and distribution, which are then fed into the electrode 11. The electrolyte solution 30, is injected into the system. Applying a voltage differential of only 5 v. between cathode and anode causes material from the face 22 of the workpiece 20 to be eroded and removed. By moving the electrode 11 and the nozzle-mixer apparatus mounted thereon, along, in the well known manner, at a constant vector displacement $S_1$ (FIG. 1) compensating for the removal of the material from the workpiece, machining can be continued at a constant rate until finished. Should the electrode be advanced at a speed greater than that necessary to merely compensate for the removal of the material while maintaining the injected electrolyte solution 30 and gas 40 at the same pressure, the interspace 21 will substantially decrease choking off the flow of electrolyte-gas mixture. The interspace 21 and sleeve 16 will fill up with conductive particle 31 and reduce the machining and erosion of material to a critical degree. If an attempt is made to force the conductive particle through the narrow interspace 21 by increasing the pressure of the electrolyte solution entering the system severe damage to both the electrode 11 and the workpiece could result. It thus appears obvious that the machining process, conventionally employed has severe speed and accuracy limitations.

Figure 3:
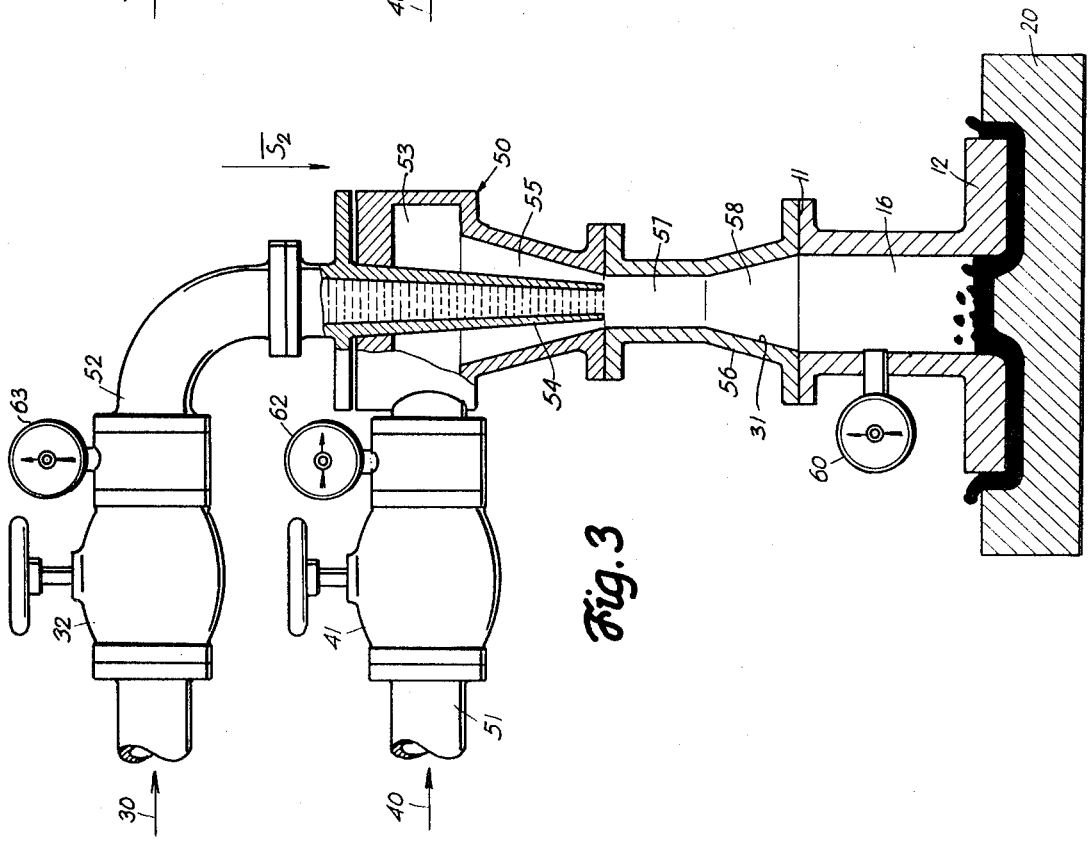
FIG. 3 is also a view similar to FIG. 1 showing the intensification of the process and, FIG. 4 is another view similar to FIG. 1 showing the process when only a substantially gaseous fluid is employed.

According to the inventive process which may be followed from FIGS. 2–3, the relative pressure of the injected electrolyte 30 and gas media 40 are initially reversed, even though the relative volumes remain the same. That is, the gas media 40 is injected at a high pressure level as seen in gauge 62 than the electrolyte solution 30, as seen in gauge 63 and consequently becomes the driving force of the system. Operatively as seen in FIG. 2 the system would work much in the same manner as previously described, in that a non-homogeneous mixture of electrolyte-gas would be supplied the interspace 21 wherein the metal from the workpiece would be eroded. However, it has been found that the movement of electrode 11 can be accelerated to a degree substantially twice that of the conventional system, as seen by vector $S_2$ (FIG. 2) without the rapid choking of the electrolyte particles 31 in the interspace. Thus, even at altered pressure, the electrode 11 speed $S_2$ increases the rate at which machining is accomplished.

Figure 4:
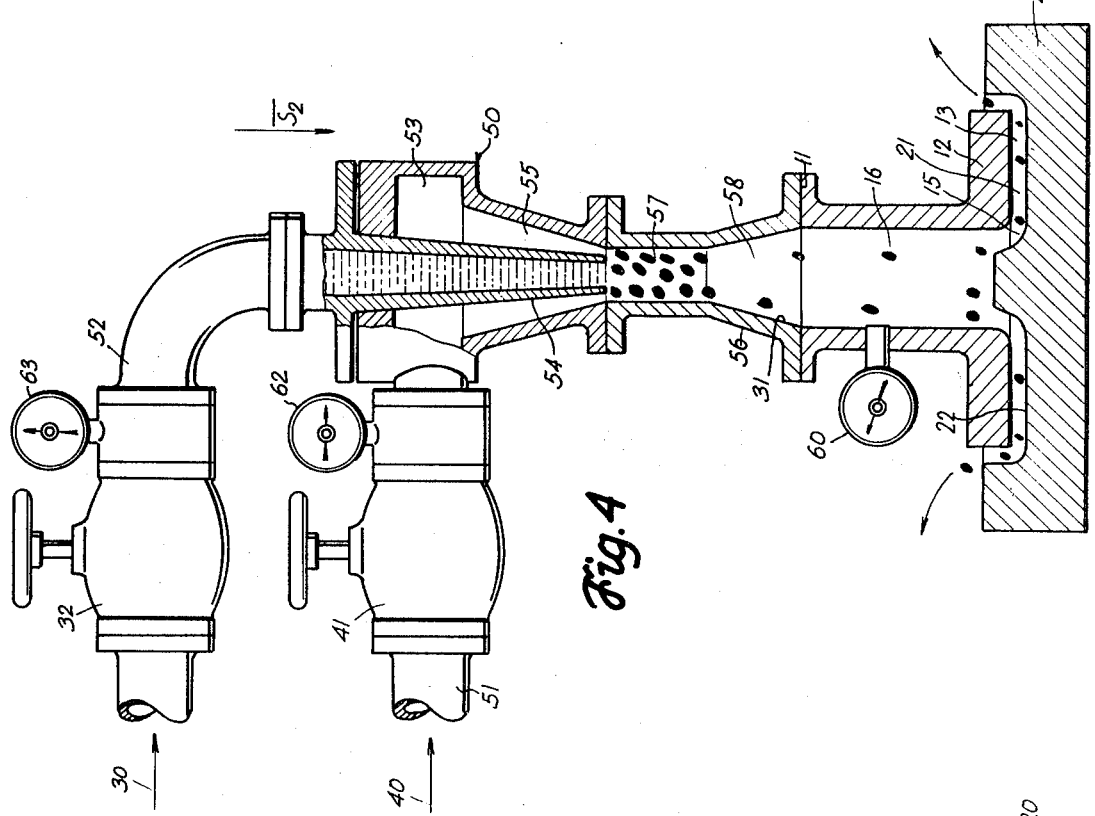

Sometime later, however, as the size of the interspace 21 narrows, it does become confined and the conductive electrolyte particles 31 choke-up within the interspace 21 and block it, as seen in FIG. 3. As the density of the particles 31 increase, the pressure in the electrode 11 changes and is sensed by gauge 60. The change in pressure within the electrode 11 is transmitted via suitable control units well known in the art to the valve 32 whereby the electrolyte solution supplied to conduit 52 is caused to cease flowing, or is so caused to diminish in flow rate into the nozzle 54 as seen in FIG. 3. Meanwhile, in the interspace 21 the density of the conductive particles 31 increases, as does the current density between cathodic electrode 11 and anodic workpiece 20, consequently, machining or erosion of material increases in intensity. In this intensified erosive action the electrolyte-gas mixture in interspace 21 rapidly becomes heated lowering to a marked degree its viscosity. As soon as the viscosity of the electrolyte-gas mixture reaches a low enough point, the pressure of the gas media 40, now significantly greater than that of the electrolyte-gas mixture, acts to blow the ocnductive particle 31 outwardly of the interspace, passing hrough the interspace 21 for a few moments thereafter as a blast of substantially pure gas media, as seen in FIG. 4. When this occurs the relative pressure levels of injected electrolyte 30 and gas 40 resume their initial positions as sensed again by gauge 60. The control units again cause valve 32 to feed the electrolyte solution 30 to the nozzle 54. Thus machining operation can be conducted again as described in connection with FIG. 2, Soon however the system repeats itself and the interspace becomes blocked, as seen in FIG. 3, to thereafter be blown free as seen in FIG. 4. This alternation and cyclic process is carried on for the desired length of the machining operation.

In addition to increasing the speed at which the machining operation is performed, the inventive process permits the interspace 21 to be maintained at an extremely narrow separation. It has been found that the space may range from a depth of one-third to one-fifteenth of that normally maintained in conventional operation. Consequently because of the narrow interspace 21 precise configuration of machining can be accomplished rapidly. Even minor depressions and projections on the face of the electrode can be reproduced on the workpiece 20.

It is possible in the inventive process that during some part of the cyclical operation that a portion but not all of the electrode outlet 15 or the interspace 21 becomes choked with conductive particles 31, resulting in only part of the interspace 21 being rinsed with alternate media. This will not however have any effect on the ultimate machining operation since the cyclical operation will sooner or later compensate for it, by blowing or eroding at a different degree.

It will be observed that the alternate choking of the interspace, rinsing with gas media and rinsing with electrolyte gas mixture is dependent upon the distance of the interspace 21, the initial pressures of the fluids, the speed at which the electrode 11 is advanced, as well as on such factors the size of the conductive particles 31. Consequently exact time intervals and parameters of operation are difficult to set forth. However the employment of a pressure gauge indicator in electrode 11 or other suitable sensing means for determining the flow of particles is sufficient to control operation. Conventional associated signal responsive units will also permit accurate and quick automatic operation of the supply valves. Thus the entire operation can be based on one factor, namely; the changes in pressure drop across the interspace 21 and electrode outlet 15.

Many modifications may be made in the process. For example, instead of alternating between an electrolyte-gas mixture and a substantially pure gas media, a substantially pure electrolyte may be alternated with the gas. Even two electrolyte-gas mixtures of different conductive values may be alternated with the gas media. It will be certainly obvious that numerous changes can be made to the apparatus which as described is for illustrative purposes only.

Since numerous changes can of course be effected it is intended that the present disclosure be taken in its broadest sense and not limiting in any way.

What is claimed is:

1. In the process of electrochemically eroding metal workpieces by means of passing a current between an electrode and said workpiece, the improvement comprising the steps of supplying at least one electrolyte solution, and a gaseous media, mixing said electrolyte solutions and said gaseous media to form an electrolyte-gas fluid including conductive particles, and sequentially feeding said electrolyte, said fluid mixture, and said gaseous media between said electrode and said workpiece.

2. The process according to claim 1 including the steps of maintaining said electrode spaced from said workpiece a predetermined distance to effect the blocking of the passage of the conductive particles in said fluid mixture and thereafter clearing said blockage by the passage of said gaseous media.

3. The process according to claim 2 wherein the blockage of said conductive particles is sensed by changes in pressure within the interspace between said electrode and said workpiece, and wherein the supply of electrolyte solution is stopped in response thereto, permitting the supply only of said gaseous media.

4. The process in accordance with claim 3 wherein the alternation of said electrolyte-gas fluid and said gaseous media is accomplished cyclically and repetitively.

5. The process according to claim 1 wherein said gaseous media is supplied at a pressure greater than that of the electrolyte solution.

6. The process, according to claim 1 including the step of varying the supply of electrolyte and gas relative to each other in dependence upon the pressure of said fluid mixture between said electrode and said workpiece.

References Cited

UNITED STATES PATENTS

| | | | |
|---|---|---|---|
| 3,284,327 | 11/1966 | Maeda et al. | 204—277 X |
| 3,378,473 | 4/1968 | Inoue | 204—277 X |
| 3,461,056 | 8/1969 | Maeda et al. | 204—224 |

JOHN H. MACK, Primary Examiner

N. A. KAPLAN, Assistant Examiner

U.S. Cl. X.R.

204—224, 277